(12) United States Patent
Grabau et al.

(10) Patent No.: US 6,966,758 B2
(45) Date of Patent: Nov. 22, 2005

(54) WIND TURBINE ROTOR BLADE COMPRISING ONE OR MORE MEANS SECURED TO THE BLADE FOR CHANGING THE PROFILE THEREOF DEPENDING ON THE ATMOSPHERIC TEMPERATURE

(75) Inventors: Peter Grabau, Kolding (DK); Ib Frydendal, Rødding (DK)

(73) Assignee: LM Glasfiber A/S, Lunderskov (DK)

( * ) Notice: Subject to any disclaimer, the term of this patent is extended or adjusted under 35 U.S.C. 154(b) by 15 days.

(21) Appl. No.: 10/323,705

(22) Filed: Dec. 17, 2002

(65) Prior Publication Data

US 2004/0115060 A1   Jun. 17, 2004

Related U.S. Application Data

(63) Continuation of application No. PCT/DK01/00423, filed on Jun. 18, 2001.

(30) Foreign Application Priority Data

Jun. 19, 2000  (DK)  ................................ 2000 00946

(51) Int. Cl.$^7$ .............................................. B63H 1/26
(52) U.S. Cl. .................... 416/229 R; 416/23; 416/228; 416/230; 415/12
(58) Field of Search .............................. 416/23, 229 R, 416/230, 228; 415/12

(56) References Cited

U.S. PATENT DOCUMENTS

| 3,042,371 | A | | 7/1962 | Fanti |
| 3,373,930 | A | | 3/1968 | Rom |
| 3,857,750 | A | * | 12/1974 | Winter et al. ............... 428/66.7 |
| 3,893,639 | A | | 7/1975 | Croswell, Jr. |
| 4,619,580 | A | | 10/1986 | Snyder |
| 4,648,921 | A | * | 3/1987 | Nutter, Jr. ............... 416/229 R |
| 5,074,753 | A | * | 12/1991 | Covington et al. ...... 416/229 R |
| 5,463,794 | A | * | 11/1995 | Erland ......................... 16/225 |
| 5,934,609 | A | | 8/1999 | Kuklinski |
| 6,182,929 | B1 | | 2/2001 | Martin et al. |
| 6,488,238 | B1 | * | 12/2002 | Battisti ....................... 244/204 |

FOREIGN PATENT DOCUMENTS

| DK | PR 172218 BA | 7/1996 |
| WO | WO 94/04820 | 3/1994 |
| WO | WO 95/19500 | 7/1995 |
| WO | WO 01/98654 | 12/2001 |

OTHER PUBLICATIONS

Daniel, I.M., "*Methods of Testing Composite Materials*", Chapter VI, pp. 316-319.
Advanced Topics in Aerodynamics, *High-Life Aerodynamics—High-Lift Wing Systems*, Aerodyn.org, Jan. 8, 2002, pp. 1-3.
Aerodynamics Questions, AircraftMuseum.com, aerospaceweb.org, Jan. 8, 2002, pp. 1-3.

* cited by examiner

*Primary Examiner*—Theresa Trieu
(74) *Attorney, Agent, or Firm*—Brinks Hofer Gilson & Lione

(57) ABSTRACT

A wind turbine rotor blade (10) comprising one or more means (4) secured to the blade (10) for changing the profile thereof depending on the atmospheric temperature. The means comprises at least one laminate having at least two layers of materials with differing thermal expansion coefficients.

6 Claims, 5 Drawing Sheets

WIND TURBINE ROTOR BLADE COMPRISING ONE OR MORE MEANS SECURED TO THE BLADE FOR CHANGING THE PROFILE THEREOF DEPENDING ON THE ATMOSPHERIC TEMPERATURE

This application is a continuation of PCT/DK01/00423, filed Jun. 18, 2001, which claimed priority to Denmark Patent Application No. DK PA 2000 00946, filed June 19, 2000.

TECHNICAL FIELD

The invention relates to a wind turbine rotor blade comprising one or more means secured to the blade for changing the profile thereof depending on the atmospheric temperature.

BACKGROUND ART

Stall-controlled and active stall-controlled wind turbines are designed to operate at a substantially fixed speed of rotation, ie the blade rotates at the same speed irrespective of the wind speed. At high wind speeds, the power output has to be limited so as not to overload the generator. Pitch control, active stall control or (passive) stall control may be used for this purpose. At pitch control and active stall control the blades are mounted such on the hub that they are able to turn around their longitudinal axis. The rotor blades may thus be continuously adjusted to provide the lift rendering the desired power. At (passive) stall control the blades are fixedly secured to the hub and are thus not able to turn around their longitudinal axis. The stall properties of the blade is used for limiting the aerodynamic lift and thus the power output. Stall control renders a simple and reliable adjustment of the turbine, but is encumbered by the drawback that the lift varies according to the air density. The density of air depends on the air pressure and the air temperature. Usually the air temperature is the decisive factor of these two parameters. At high temperatures and thus low air density, a stall-controlled wind turbine typically does not reach the prescribed maximum power output. Conversely, during winter, where the temperature is low, the wind turbine may overproduce power, whereby the gear box or the generator may be also overloaded. Optionally a built-in security system ensures that the turbine is stopped due to overproduction.

WO 94/04820 discloses a wind turbine with stall-controlled rotor blades, and where a temperature sensor is functionally connected to an actuator for adjusting the properties of the blade such that the blade at a given wind speed is adapted to render a higher output at an increasing temperature and a reduced output at a decreasing temperature, thus at any temperature compensating for the natural tendency of the blade to produce a higher output at colder temperature. According to the WO publication this is obtained by means of a temperature-sensitive element mounted at the leading edge of the blade for adjusting the shape thereof at temperature changes. FIGS. 2 and 3 of the WO publication show the element and the shape of the leading edge are shown at a high and a low temperature, respectively. It is not disclosed how the temperature-sensitive element operates. One drawback of the blade according to the WO publication is that the element may cause sudden stall over the entire profile and thus cause a drastic reduction of the maximum power output.

U.S. Pat. No. 3,373,930 discloses a fan, where the fan blades are formed of laminates of different material layers such that the curvature of the blades varies according to the air temperature.

BRIEF DESCRIPTION OF THE INVENTION

The object of the invention is to provide a new and improved means for adjusting the profile of a wind turbine blade depending on the air temperature.

According to the invention the means is characterised in that it comprises at least one laminate having at least two layers of materials with differing thermal expansion coefficients. As a result it is possible to change the profile of the rotor blade and thus increase or reduce the maximum lift power depending on the air temperature, the means bending more or less depending on the temperature. The wind turbine may thus produce close to its maximum power output (the rated power) even at high air temperatures.

According to a preferred embodiment the laminate comprises a first and a second layer of a composite material. A means of such materials is advantageous in that it is not electrically conducting and thus does not attract lightning.

Tests have shown that fibreglass-reinforced epoxy has positive thermal expansion coefficients both in the fibre orientation and across the fibre orientation, while carbon fibre-reinforced or aramid fibre-reinforced epoxy has negative thermal expansion coefficients in the fibre orientation and positive thermal expansion coefficients across the fibre orientation.

It applies to all three composite materials that the largest thermal expansion coefficient is across the fibre orientation.

According to a particularly preferred embodiment the first layer is made of fibreglass-reinforced epoxy, in which the fibres extend in the transverse direction of the means and thus of the blade, and the second layer is made of aramid fibre-reinforced epoxy, in which the fibres extend in the longitudinal direction of the means and of the blade. By using such a means a large curvature change per temperature unit is obtained.

According to the invention the laminate may optionally be made of a bimetal, eg bonded and rolled metal alloys containing for instance nickel, iron, magnesium and chrome. The electric conductivity of such a flap may be used for conducting lightning down or for conducting current to an electric de-icing system. Modern very large wind turbines must be provided with light in the blade tips. The electric conductivity of the bimetal flap may also be used for this purpose.

According to a preferred embodiment of the invention the means may be a flap mounted adjacent the trailing edge of the rotor blade. It is easy to after the profile by means of such a laminated flap.

According to the invention the flap may extend between 5% and 70% of the total length of the blade. The width of the flap may be between 1% and 70%, preferably 5% of the chord of the blade. The flap is thus adaptable to the individual wind turbine and the actual temperature variations.

According to the invention the flap may comprise several laminates facing opposite of each other and joined in pairs along the leading and trailing edges of the flap. A larger change in the profile/flap per temperature unit is obtained thereby.

According to a preferred embodiment the flap may be mounted on the aerodynamic pressure side of the blade.

Instead of using one long means, it may be advantageous to provide the blade with several separate means arranged end to end in the longitudinal direction of the blade so as to reduce any problems arising in connection with the temperature-dependent expansion/contraction of the means in the longitudinal direction.

Finally, a rotor blade may be formed integrally with one or several means according to the invention.

BRIEF DESCRIPTION OF THE DRAWINGS

The invention is explained in greater detail below by means of embodiments illustrated in the drawings, in which.

BEST MODE FOR CARRYING OUT THE INVENTION

Figure 1:
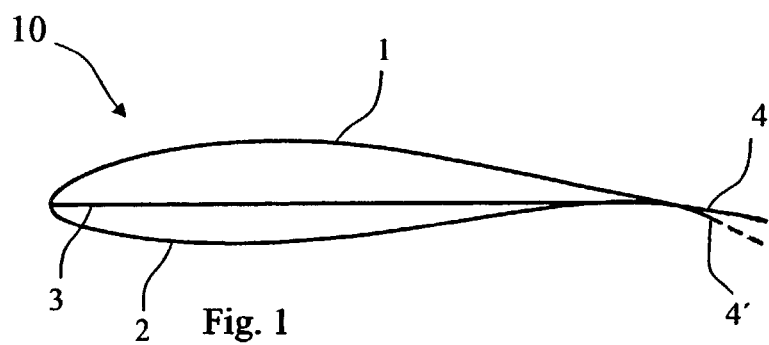
FIG. 1 is diagrammatic sectional view through a wind turbine rotor blade provided with a means according to the invention.

According to the invention the blade profile 10 shown in FIG. 1 is provided with a flap 4 at its trailing edge. The aerodynamic pressure side of the blade profile is denoted by the reference numeral 2 and the suction side of the blade profile 10 facing the wind turbine tower on upwind turbines is denoted by the reference numeral 1. The width of the flap 4 shown in FIG. 1 is 10% of the chord 3 of the profile. The flap 4 is illustrated by means of a continuous line at a first temperature and by means of a dash line at a second higher temperature. The shown flap 4 may be made of a bimetal formed of two bonded and rolled metal layers with differing thermal expansion coefficients. A flap of bimetal may optionally be used as a conductor for conducting lightning down into the ground. The flap is, however, preferably made of a laminate of composite materials, eg a layer of fibre-glass-reinforced epoxy, in which the fibres extend in the transverse direction of the flap and thus of the blade, and a layer of aramid fibre-reinforced epoxy (Kevlar™), in which the fibres extend in the longitudinal direction of the fibres and thus of the blade. In such a laminate the aramid fibre-reinforced epoxy constitutes the "active" layer, aramid fibres having a larger thermal expansion coefficient than fibre glass. The aramid fibre/epoxy layer thus has to face the suction side 1.

Figure 2:
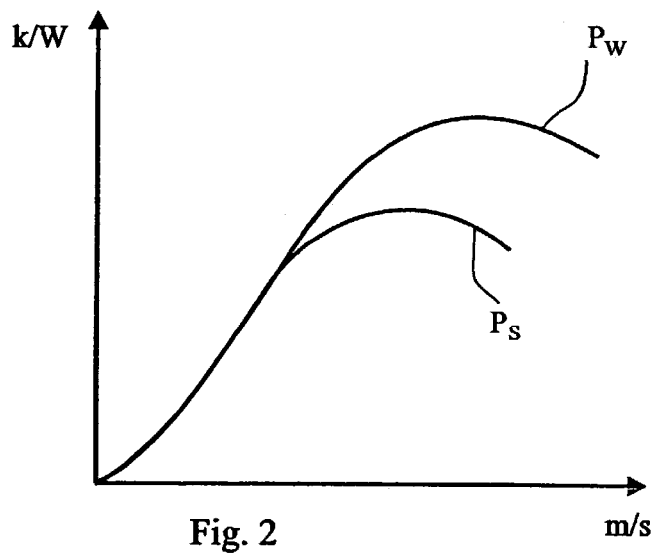
FIG. 2 illustrates the produced power output of a known stall-controlled wind turbine versus the wind speed at two different air temperatures.

FIG. 2 is a graph of two power curves, $P_w$ and $P_s$, illustrating the power produced by the wind turbine versus the wind speed in m/s. $P_w$ denotes a typical, produced mean power output in winter, where the air temperature is low and the air thus has a comparatively high density, while $P_s$ denotes the mean produced power output in summer, where the temperature is higher. It may be advantageous to compensate for this difference in produced power between the winter months and the summer months by adjusting the angle of the blades once in the spring and once in the autumn. It is, however, not possible to obtain full compensation, the temperature varying through-out the winter months and the summer months. The night-time and day-times temperatures may also vary greatly.

Figure 3:
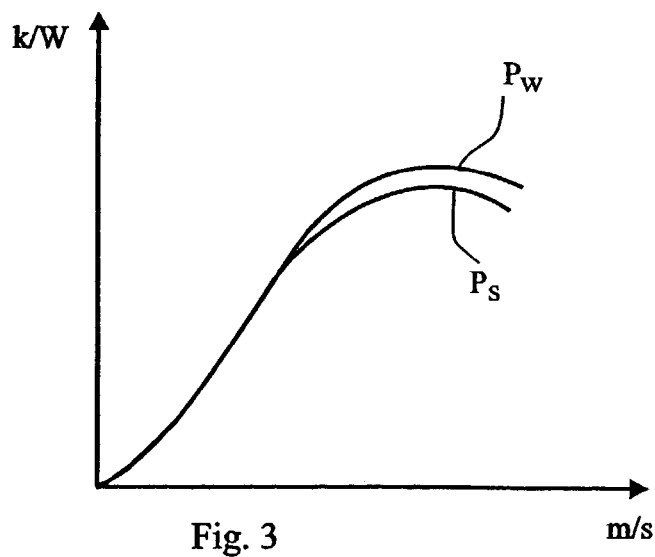
FIG. 3 illustrates the produced power output of a wind turbine with rotor blades according to the invention versus the wind speed at two different air temperatures.

FIG. 3 illustrates similar power curves, $P_w$ and $P_s$, of a wind turbine with rotor blades having flaps according to the invention. The higher summer temperature relative to winter temperature and the higher day-time temperature relative to the night-time temperature causes the flap 4 to bend downwards towards the pressure side and increases the lift of the blade. The flap may be dimensioned by means of many parameters, such as materials, the thickness of the individual laminate layers, its length, its width and its position on the blade profile. The more the flap is dimensioned to compensate for the temperature variations, the closer the curve $P_s$ is to the curve $P_w$. In FIG. 3 $P_s$ is just below $P_w$, but may just as well be slightly above. The important factor is that $P_w$ and $P_s$ are as close to the rated power of the turbine as possible.

Figure 4:
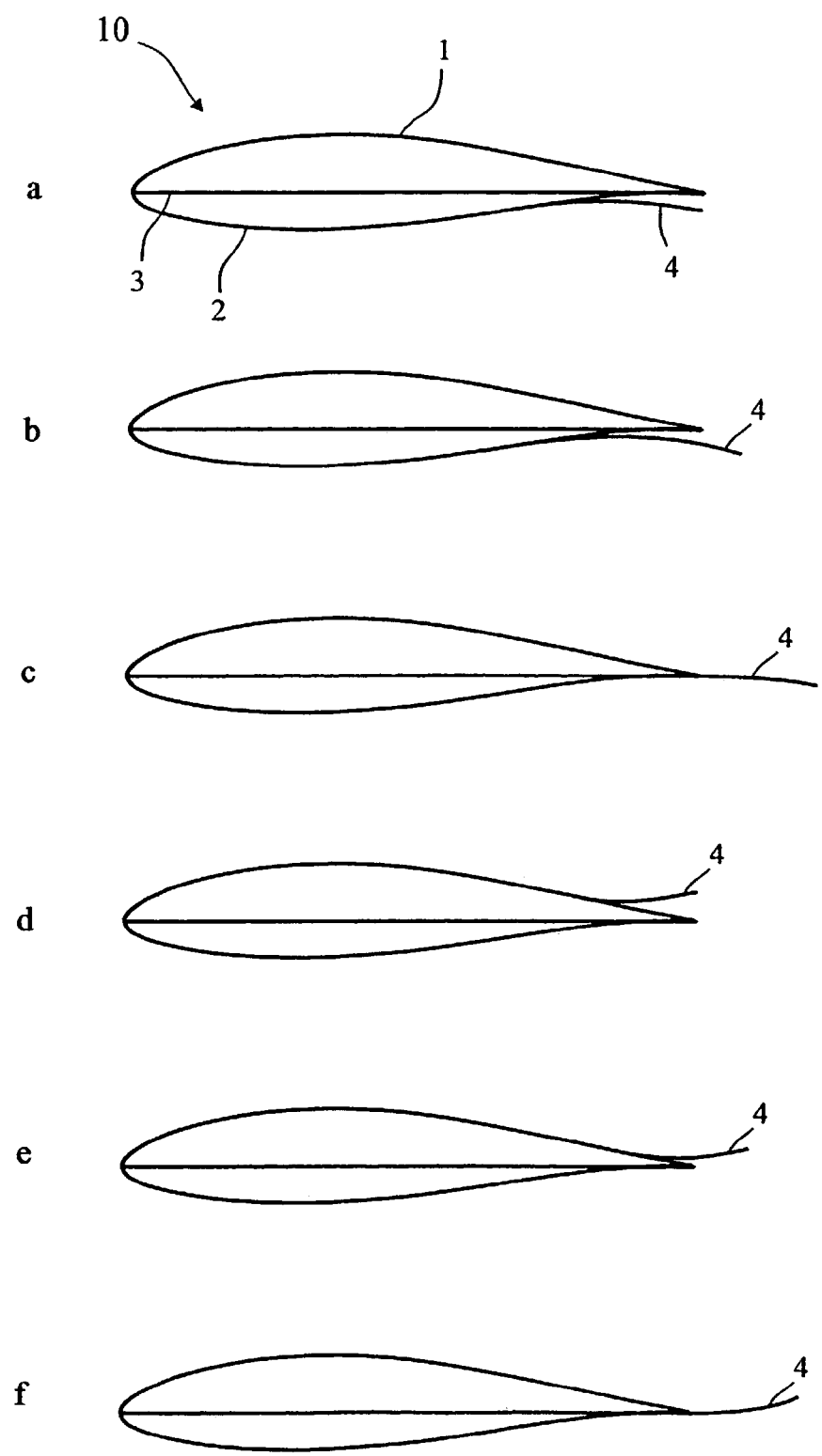
FIG. 4 is a diagrammatic view of six different positions of a flap according to the invention, the width of said flap being comparatively small.
Figure 5:
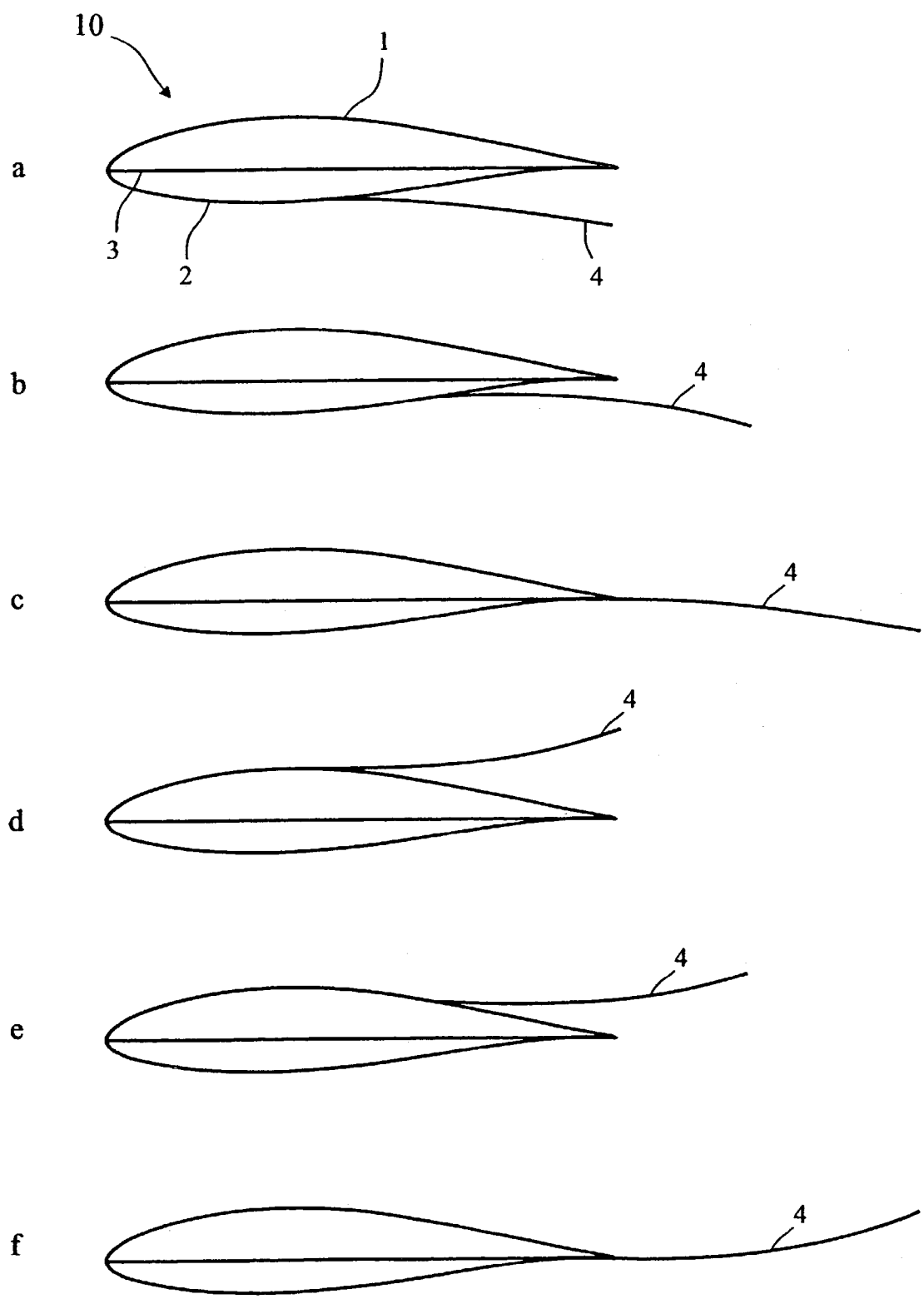
FIG. 5 is a diagrammatic view of six different positions of a flap according to the invention, the width of said flap being comparatively large.

FIG. 4 illustrates how a flap 4 according to the invention may be arranged in various positions on the blade profile 10, said flap having a width corresponding to about 10% of the chord 3 of the blade profile. In FIG. 4a the flap 4 is arranged on the pressure side 2 and interspaced from the trailing edge by a distance substantially corresponding to the width of the flap 4. In FIG. 4b the flap 4 is arranged on the pressure side 2, but so close to the trailing edge of the blade 10 that it extends beyond the trailing edge with about half its width. In FIG. 4c the flap 4 is mounted on the trailing edge and thus extends end to end with the blade profile. In FIG. 4d the flap 4 is arranged on the suction side 1 of the blade profile and interspaced from the trailing edge of the blade 10 by a distance corresponding to the width of the flap. In FIG. 4e the flap 4 is arranged so close to the trailing edge that it extends therebeyond with about half its width. In FIG. 4f the flap 4 is secured to the trailing edge. In the embodiments shown in FIGS. 4a, b and c the active laminate layer of the flap faces upwards such that the flap bends increasingly downwards towards the pressure side as the temperature rises. Also in the embodiments shown in FIGS. 4d, e and f the active laminate layer of the flap faces upwards such that the flap bends increasingly downwards towards the pressure side as the temperature rises. In all of the embodiments shown in FIGS. 4a–4f the lift increases with the rising temperature.

In the embodiments shown in FIGS. 5a–5f, the position of the flap 4 on the blade profile corresponds to that of the embodiments shown in FIGS. 4a–4f; the width of the flap 4 being about 70% of the chord of the blade profile in FIGS. 5a–5f. The embodiments shown in FIG. 5 are particularly advantageous, when the thermal expansion coefficients of the materials used in the laminate are very similar.

Figure 6:
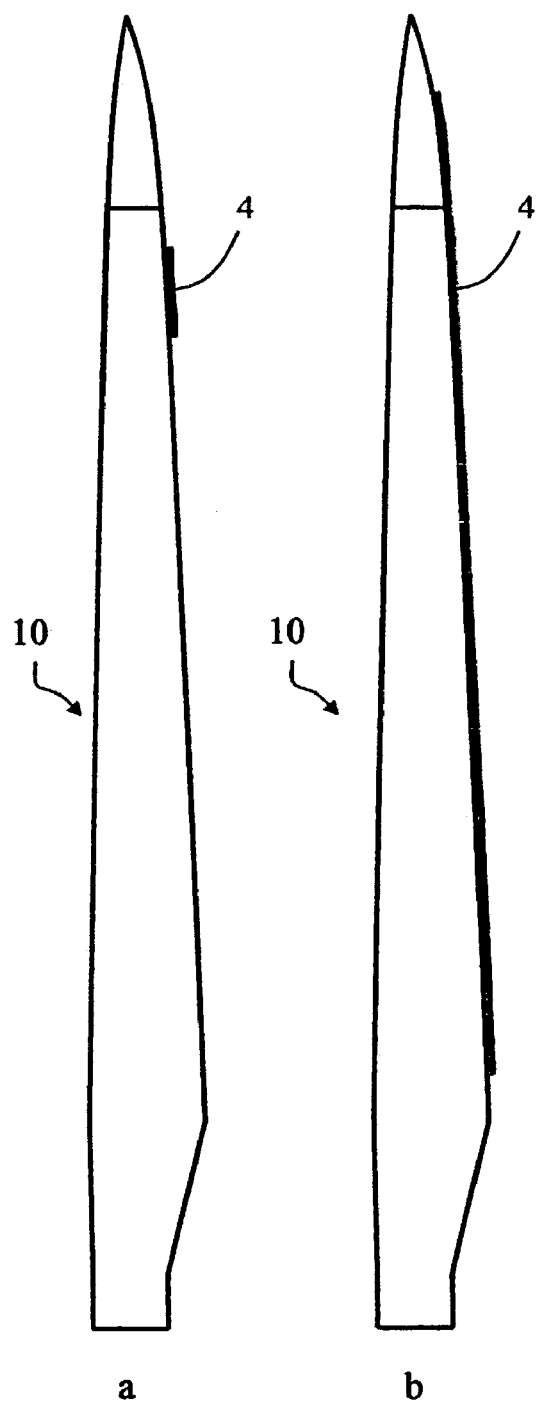
FIG. 6 illustrates two examples of the position and extension of a flap on a rotor blade, said blade being diagrammatically shown.

FIG. 6 is a diagrammatic view of how the flap 4 may extend in the longitudinal direction of the rotor blade. FIG. 6a illustrates a typical example of a rotor blade, where the flap 4 arranged adjacent the tip of the blade only extends about 5% of the total length of the wind turbine blade. The flap 4 shown in FIG. 6b extends about 70% of the total length of the rotor blade.

Figure 7:
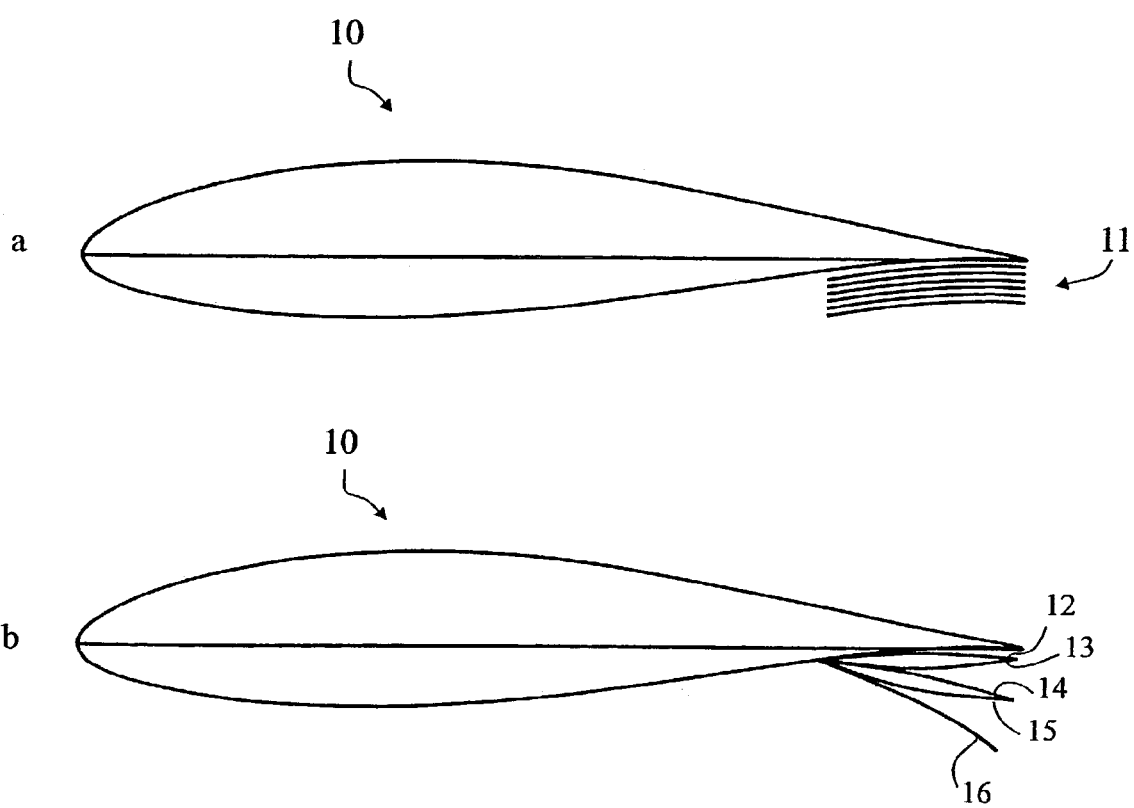
FIG. 7 illustrates an example of a particular embodiment of a rotor blade with a flap according to the invention at two different air temperatures.

FIG. 7 illustrates a particular embodiment, in which the flap is formed of several laminates facing opposite of each other and joined along the leading and trailing edges of the flap. In FIG. 7a the flap 11 is shown at a first temperature, and in FIG. 7b the flap 11 is shown at a second higher temperature. As most evident in FIG. 7b, the flap comprises a total of five laminates 12, 13, 14, 15, 16. All five laminates are secured to each other and to the rotor blade. The active side of the laminates 12, 14 and 16, ie the side having the highest temperature coefficient, faces upwards and the active side of the laminates 13 and 15 faces downwards. The laminates 12 and 13 are joined at their free ends and so are the laminates 14 and 15. As a result a very high deflection versus the temperature is obtained. If required, lower or a higher number of laminates may be used. Beneficial results have been obtained at tests with a flap extending in the entire length of the blade and having a width of merely 0.7% of the chord of the blade.

The invention is not restricted to the shown embodiments. The means for changing the profile of the rotor blade may for instance be a so-called slat arranged close to the leading edge of the blade.

The means may be made of any laminate of suitable properties, ie two material layers with differing thermal expansion coefficients. When using a bimetal, an alloy containing nickel, iron, manganese or chrome is often chosen as the active layer, and invar, which is an iron-nickel alloy containing 36% nickel, is chosen as the passive layer. If the risk of strokes of lightning is to be reduced in the means, laminates of a non-electrically conducting material is preferred, preferably two composite materials having differing thermal expansion coefficients. As mentioned above aramid fibre-reinforced epoxy, in which the fibres extend in the longitudinal direction of the means, is preferred as the active component and fibreglass-reinforced epoxy, in which the fibres extend in the transverse direction of the means, is preferred as the passive component. However, other materials, such as aramid fibre-reinforced polyester and fibreglass-reinforced polyester may be used.

The means may be mounted on the rotor blade by means of gluing and/or fastening by screws. Optionally the means may be formed integrally with the blade during the manufacture of the blade.

Irrespective of the means is a slat for fastening thereof adjacent the leading edge of the blade or a flap for fastening thereof adjacent the trailing edge of the blade, several means may be provided on the blade. Any expansion/contraction problems occurring in the means in its longitudinal direction and thus in the longitudinal direction of the blade may thus be reduced.

What is claimed is:

1. A wind turbine rotor blade (10) comprising one or more profile adjusting means (4) secured to the blade (10) for changing the profile thereof depending on the atmospheric temperature characterized in that the profile adjusting means (4) comprises at least one laminate having at least two layers of materials with differing thermal expansion coefficients, and the profile adjusting means (4) is formed of a laminate comprising a first and a second laminate layer of a composite material, and the profile adjusting means is a flap (4) mounted adjacent the trailing edge of the rotor blade (10), and the flap (4) comprises several laminates facing opposite each other and joined along the leading and trailing edges of the flap (4).

2. A wind turbine rotor blade (10) according to claim 1, characterized in that the flap (4) is mounted on the pressure side (2) of the blade (10).

3. A wind turbine rotor blade (10) comprising one or more profile adjusting means (4) secured to the blade (10) for changing the profile thereof depending on the atmospheric temperature characterized in that the profile adjusting means (4) comprises at least one laminate having at least two layers of materials with differing thermal expansion coefficients, and the profile adjusting means (4) is formed of a laminate comprising a first and a second laminate layer of a composite material, and the first layer is made of fibreglass-reinforced epoxy, in which the fibers extend in the transverse direction of the profile adjusting means, and the second layer is made of aramid fibre-reinforced epoxy, in which the fibers extend in the longitudinal direction of the profile adjusting means, and the profile adjusting means is a flap (4) mounted adjacent the trailing edge of the rotor blade (10), and the flap (4) comprises several laminates facing opposite each other and joined along the leading and trailing edges of the flap (4).

4. A wind turbine rotor blade (10) according to claim 3, characterized in that the flap (4) is mounted on the pressure side (2) of the blade (10).

5. A wind turbine rotor blade (10) comprising one or more profile adjusting means (4) secured to the blade (10) for changing the profile thereof depending on the atmospheric temperature characterized in that the profile adjusting means (4) comprises at least one laminate having at least two layers of materials with differing thermal expansion coefficients, and the laminate is made of a bimetal, and the profile adjusting means is a flap (4) mounted adjacent the trailing edge of the rotor blade (10), and the flap (4) comprises several laminates facing opposite each other and joined along the leading and trailing edges of the flap (4).

6. A wind turbine rotor blade (10) according to claim 5, characterized in that the flap (4) is mounted on the pressure side (2) of the blade (10).

* * * * *